US009391948B2

(12) United States Patent
Robitaille et al.

(10) Patent No.: US 9,391,948 B2
(45) Date of Patent: *Jul. 12, 2016

(54) METHODS OF DETECTING AND ASSIGNING IP ADDRESSES TO DEVICES WITH ARP REQUESTS

(71) Applicant: Accedian Networks Inc., St-Laurent (CA)

(72) Inventors: Claude Robitaille, St-Placide (CA); Guillaume Lemieux, St-Eustache (CA)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,359

(22) Filed: Dec. 15, 2015

(65) Prior Publication Data

US 2016/0099909 A1 Apr. 7, 2016

Related U.S. Application Data

(63) Continuation of application No. 14/606,630, filed on Jan. 27, 2015, now Pat. No. 9,246,871, which is a continuation of application No. 14/453,808, filed on Aug. 7, 2014, now Pat. No. 8,982,730, which is a continuation of application No. 13/551,998, filed on Jul. 18, 2012, now Pat. No. 8,830,869.

(51) Int. Cl.
*H04L 29/12* (2006.01)
*H04L 12/26* (2006.01)
(Continued)

(52) U.S. Cl.
CPC .............. *H04L 61/103* (2013.01); *H04L 45/02* (2013.01); *H04L 61/2007* (2013.01); *H04L 61/6063* (2013.01); *H04L 63/0236* (2013.01)

(58) Field of Classification Search
CPC .... H04L 61/103; H04L 43/10; H04L 61/2007
See application file for complete search history.

(56) References Cited

U.S. PATENT DOCUMENTS 6,166,688 A 12/2000 Cromer
6,367,037 B1 4/2002 Remer
(Continued)

FOREIGN PATENT DOCUMENTS

CN 103685452 3/2014
EP 2421200 2/2012
(Continued)

OTHER PUBLICATIONS

Avago Technologies. "1000BASE-T Interface and Functionality of ABCU57-xxRZ Gigabit Ethernet Small Form Puggable Electrical Transceivers Over Category 5 Unshielded Twisted Pair Cable—Application Note 5286." XP055091424, Sep. 14, 2010 [online] [retrieved on Dec. 4, 2013]. Retrieved from the Internet <URL: http:--www.avagotech.com-docs-AV02-2643EN‎> (16 pages).

(Continued)

*Primary Examiner* — Mark Rinehart
*Assistant Examiner* — Gbemileke Onamuti
(74) *Attorney, Agent, or Firm* — Nixon Peabody LLP

(57) ABSTRACT

A method of discovering and assigning an IP address to a device to be discovered in a communication network having multiple interconnected nodes includes continuously monitoring, by the device to be discovered, the network for address resolution protocol (ARP) requests. The discoverer node transmits a number of ARP request to the network. The device to be discovered receives the number of ARP requests. The device to be discovered determines whether the number of ARP requests are unanswered by other devices in the network. The device to be discovered answers to the number of ARP requests with an ARP reply to claim an IP address associated with the number of ARP requests. The discoverer node and the device to be discovered exchange a pair of User Datagram Protocol (UDP) packets to complete the detection process.

18 Claims, 4 Drawing Sheets

(51) Int. Cl.
  *H04L 12/751* (2013.01)
  *H04L 29/06* (2006.01)

(56) References Cited

U.S. PATENT DOCUMENTS

| | | |
|---|---|---|
| 6,865,602 B1 | 3/2005 | Nijemcevic |
| 6,987,743 B2 | 1/2006 | Chen et al. |
| 7,039,688 B2 | 5/2006 | Matsuda |
| 7,225,243 B1 | 5/2007 | Wilson |
| 7,440,781 B2 | 10/2008 | Beach |
| 7,570,657 B1 | 8/2009 | Lo |
| 7,778,162 B2 | 8/2010 | Yu |
| 7,787,455 B2 | 8/2010 | Cherchall |
| 7,912,075 B1 | 3/2011 | Holland |
| 8,023,465 B2 | 9/2011 | Prehofer |
| 8,098,671 B1 | 1/2012 | Deruijter |
| 8,233,437 B2 | 7/2012 | Tazaki |
| 8,315,626 B2 | 11/2012 | Huotari |
| 8,360,975 B1 | 1/2013 | Schwieterman |
| 8,509,072 B2 | 8/2013 | Lee |
| 8,571,029 B1 | 10/2013 | Aggarwal |
| 8,588,751 B2 | 11/2013 | Rinta-Aho |
| 8,830,869 B2 | 9/2014 | Robitaille |
| 8,982,730 B2 | 3/2015 | Robitaille |
| 2003/0053421 A1 | 3/2003 | Yoshimura |
| 2003/0056008 A1 | 3/2003 | Russell |
| 2003/0225864 A1 | 12/2003 | Gardiner |
| 2003/0229809 A1 | 12/2003 | Wexler |
| 2004/0249906 A1 | 12/2004 | Olbricht |
| 2005/0135306 A1 | 6/2005 | McAllen |
| 2005/0138428 A1 | 6/2005 | McAllen |
| 2005/0281256 A1 | 12/2005 | Taipale |
| 2006/0274671 A1 | 12/2006 | Budampati |
| 2007/0019598 A1 | 1/2007 | Prehofer |
| 2008/0077425 A1 | 3/2008 | Johnson |
| 2008/0140815 A1 | 6/2008 | Brant |
| 2008/0205341 A1 | 8/2008 | Koh |
| 2008/0261574 A1 | 10/2008 | Rinta-Aho |
| 2009/0085806 A1 | 4/2009 | Piersol |
| 2009/0201886 A1 | 8/2009 | Lee |
| 2009/0251867 A1 | 10/2009 | Sharma |
| 2010/0054154 A1 | 3/2010 | Lambert |
| 2010/0080248 A1 | 4/2010 | Aweya |
| 2010/0274917 A1 | 10/2010 | Cherchali |
| 2010/0280858 A1 | 11/2010 | Bugenhagen |
| 2011/0283140 A1 | 11/2011 | Stevens |
| 2011/0304583 A1 | 12/2011 | Kruglick |
| 2011/0305150 A1 | 12/2011 | Haver |
| 2012/0014383 A1 | 1/2012 | Geromel |
| 2012/0102239 A1 | 4/2012 | Huang |
| 2012/0105877 A1 | 5/2012 | Wakamatsu |
| 2012/0230186 A1 | 9/2012 | Lee |
| 2012/0284517 A1 | 11/2012 | Lambert |
| 2012/0320751 A1 | 12/2012 | Zhu |
| 2012/0327768 A1 | 12/2012 | Sarwar |
| 2013/0077968 A1 | 3/2013 | Yang |
| 2013/0172036 A1 | 7/2013 | Miklos |
| 2013/0346591 A1 | 12/2013 | Carroll |
| 2014/0024255 A1 | 1/2014 | Robitaille |
| 2014/0025790 A1 | 1/2014 | Robitaille |
| 2014/0071855 A1 | 3/2014 | Robitaille |

FOREIGN PATENT DOCUMENTS

| | | |
|---|---|---|
| KR | 20090004239 | 1/2009 |
| WO | WO2010/097514 | 9/2010 |
| WO | WO2011/054006 | 5/2011 |
| WO | WO2014/013317 | 1/2014 |
| WO | WO2014/013318 | 1/2014 |
| WO | WO2014/013320 | 1/2014 |

OTHER PUBLICATIONS

Cheshire, "Dynamic Configuration of IPv4 Link-Local Addresses," May 2005, 33 pages.
Cyclone IV Device Handbook, vol. 1, Altera, Dec. 2010 (478 pages).
Drimer and Kuhn, A Protocol for Secure Remote Updates of FPGA Configuration, pp. 50-61, 2009, Lecture Notes in Computer Science vol. 5453.
Extended European Search Report mailed Dec. 18, 2013 which issued in European Patent Application No. 13183360.0 (11 pages).
Gigabit Ethernet Auto-Negotiation, by Rich Hernandez, www.dell.com-powersolutions, 1999 (6 pages).
https:-lkml.org-lkml-2005-10-19-46__on__October__16th__2012, Ingo Molnar, Oct. 19, 2005, 7 pages.
IEEE Standard for Information Technology, Part 3: Carrier Sense Multiple Access with Collision Detection (CSMA-CD) access method and Physical Layer specifications, 2008 (315 pages).
International Search Report and Written Opinion mailed Dec. 4, 2013 which issued in International Patent Application No. PCT-IB2013-001557 (9 pages).
International Search Report and Written Opinion mailed Dec. 9, 2013 which issued in International Patent Application No. PCT-IB2013-001556 (7 pages).
International Search Report and Written Opinion mailed Nov. 26, 2013 which issued in International Patent Application No. PCT-IB2013-001559 (8 pages).
Malkin, "Traceroute Using an IP Option," Jan. 1993, 7 pages.
Plummer, "An Ethernet Address Resolution Protocol—or—Converting Network Protocol Addresses to 48.bit Ethernet Address for Transmission on Ethernet Hardware," Nov. 1982, 10 pages.
Rad Data communcations, Rad & Minature & SFP-S&SFF 8439 Specifications, Dec. 2007.
Rad Data Communications, Data Sheet-Mirici-155 Intelligent Minature GbE over STM-1-OC-3 NTU,2007-2010.
Sosnoski, "Classworking toolkit: Combining source and bytecode generation," Oct. 4, 2005, 9 pages.
Thomas, G. "Incorporating Media Converters." Contemporary Control Systems, Inc. the Extension. vol. 7, No. 6, Nov. 2006 [online] [retrieved on Dec. 4, 2013]. Retrieved from the Internet: <URL: http:--www.ccontrols.com-pdf-Extv7n6.pdf> (4 pages).

METHODS OF DETECTING AND ASSIGNING IP ADDRESSES TO DEVICES WITH ARP REQUESTS

CROSS-REFERENCE TO RELATED APPLICATIONS

This application is a continuation of and claims priority to, U.S. patent application Ser. No. 14/606,630, filed Jan. 27, 2015, now allowed, which is a continuation of U.S. patent application Ser. No. 14/453,808, filed Aug. 7, 2014, now U.S. Pat. No. 8,982,730, which is a continuation of U.S. patent application Ser. No. 13/551,998, filed Jul. 18, 2012, now U.S. Pat. No. 8,830,869, each of which is hereby incorporated by reference herein in its entirety.

This application incorporates by reference in their entireties the following applications: U.S. application Ser. No. 13/551,804, "Programmable Small Form-Factor Pluggable Module," by Robitaille and Ostiguy, U.S. application Ser. No. 13/552,022, "Systems and Methods of Using Beacon Messages to Discover Devices Across Subnets," by Robitaille and Bouffard, U.S. application Ser. No. 13/552,063, "Systems and Methods of Discovering and Controlling devices without Explicit Addressing," by Robitaille and Bouffard, U.S. application Ser. No. 13/551,984, "Systems and Methods of Installing and Operating Devices without Explicit Network Addresses," by Robitaille and Lemieux.

TECHNICAL FIELD

This invention is directed towards addressing the need for discovering when a device has been connected on a network. This discovery process can be carried out by a discoverer/tester that is located in the network. The discoverer could either be implemented in a centralized manner or distributed manner.

BACKGROUND

There is a need to be able to discover any number of devices in any directly or indirectly reachable networks when such devices do not have any layer-2 and/or layer-3 addressing information since they not actively participate in any of the normal network protocols in use.

Often the IDs or labels used by the protocols are not the same in both directions. If the device is not participating in the underlying protocols (e.g., MPLS, L2TPv3, GTP-U, etc.), the device, such as a Small Form-Factor Pluggable (SFP) with a Field Programmable Gate Array (FPGA), Network Interface Device (NID), module or other platform does not know what ID or label to use to communicate.

The device must also be able to be discovered without (but not excluding) being pre-programmed with information specific to the network or the control infrastructure.

BRIEF SUMMARY

According to one aspect of the present invention, a method of discovering and assigning an IP address to a device to be discovered in a communication network having multiple interconnected nodes includes continuously monitoring, by the device to be discovered, the network for address resolution protocol (ARP) requests. The discoverer node transmits a number of ARP request to the network. The device to be discovered receives the number of ARP requests. The device to be discovered determines whether the number of ARP requests are unanswered by other devices in the network. The device to be discovered answers to the number of ARP requests with an ARP reply to claim an IP address associated with the number of ARP requests. The discoverer node and the device to be discovered exchange a pair of User Datagram Protocol (UDP) packets to complete the detection process.

According to a further aspect of the present invention, a system for discovering and assigning an IP address to a device to be discovered in a communication network having multiple interconnected nodes, includes a discoverer node coupled to a first processor. The discoverer node is configured to transmit a number of Address Resolution Protocol (ARP) requests to the network. The system also includes the device to be discovered coupled to a second processor. The device to be discovered is configured to continuously monitor the network for ARP requests, to receive the number of ARP requests from the discoverer node and to determine whether the number of ARP requests are unanswered by other devices in the network. The device to be discovered is further configured to answer to the number of ARP requests with an ARP reply to claim an IP address associated with the number of ARP requests. The discoverer node and the device to be discovered are configured to exchange a pair of User Datagram Protocol (UDP) packets to complete the detection process.

BRIEF DESCRIPTION OF THE DRAWINGS

The foregoing and other advantages of the present disclosure will become apparent upon reading the following detailed description and upon reference to the drawings.

Figure 1:
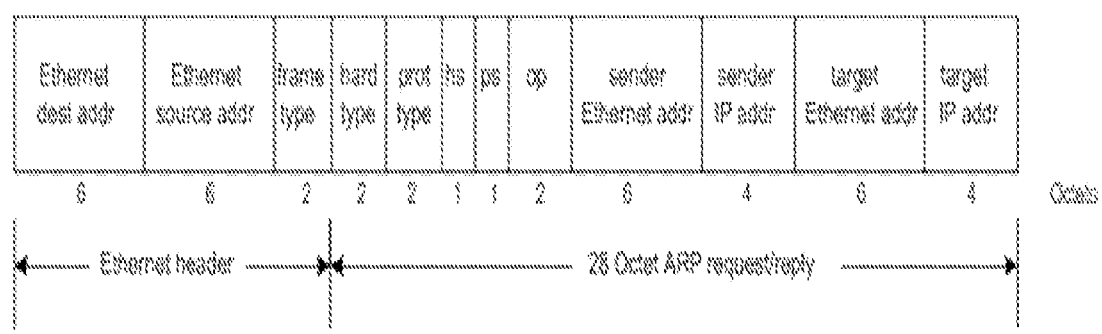
FIG. 1 illustrates the format of Address Resolution Protocol (ARP) frames.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Different types of devices can be discovered in the network using one of the techniques described in the present invention. The term discoverer is used to describe a system (e.g., testing unit, router, remote node, etc.) that is local to the subnet where the device to be discovered is located. The concept is to make sure the device to be discovered is programmed to watch for responses of a device located upstream of it.

According to one embodiment of the present invention, a discoverer transmits ARP requests. The device to discover monitors ARP requests, and after determining that one of the ARP requests might be for the device, the device sends back an ARP reply to the discoverer. At this point, the detected or discovered device can be reached using its IP address.

As described in FIG. 1, all ARP messages share the same format:

Hardware Type is set to 6 to indicate 802.3 Ethernet;
Protocol Type indicates the protocol type, for instance 0×0800 is used for IPv4;
Hardware Address Length: this is set to 6 to indicate an Ethernet MAC Address;

Protocol Address Length: this is set to 4 for an IPv4 address;

Opcode: 1 indicates an ARP Request and 2 indicates an ARP Reply;

Sender Hardware Address: for instance, this is the Ethernet MAC address of the sender;

Sender Protocol Address: this is the IP address of the sender device;

Target Hardware Address: this is the Ethernet MAC Address of the remote (target) device.

In RFC 3927 protocol, a process for detecting IPv4 address conflicts is described. The conflict detection relies on a node sending ARP_PROBE messages (encoded as ARP Request messages) with the sender hardware address set to the Ethernet MAC address of the sender and the sender IP address set to 0. The target hardware address is set to 0 and the target IP address is set to the IP address for which the sender wants to determine if there is a conflict (i.e. if the IP address is already in use by another node). A node will determine the requested IP address is free of any conflict if 3 consecutive ARP_PROBE messages can be sent without triggering an ARP Reply from the owner of the IP address and without seeing (receiving) an ARP Request for the same IP address.

The present invention leverages the basis of the process covered in RFC 3927 for a different purpose. The sender in this case is called a discoverer. The discoverer node attempts to deliver an unsolicited IP address for the purpose of detecting devices with specific capabilities. For example, a management platform may want to discover all devices with specific capabilities on a given IP subnet. The device to be detected or discovered passively listens for potentially suitable ARP Request messages and, if no other device replies to the ARP Request, the device to be discovered will assume it can claim ownership of the IP address and therefore become reachable by a management (or other type of) node and have its activation or configuration process completed. In order to confirm it was OK to claim the IP address, the device will wait for a UDP message with a well known port (such as using a UDP port type assigned by the IRNA) to confirm the ARP Request indeed originated from a trusted discoverer. If there is no suitable UDP message detected within a pre-determined timeout period, the device shall relinquish the ownership of the IP address and resume its wait for a suitable ARP Request. The ability to assign an IP address for the purpose of detecting specific node may also serve other purposes as will be understood by those familiar with the art. Other purposes may include, but are not limited to, configuration, control, management, etc.

Once a device is discovered and its IP address becomes known, a management node may interact with the discovered device over IP. This can be achieved in a number of ways: Secure Socket Layer/Hypertext Transfer Protocol Secure (SSL/HTTPS) based WEB interface or Command Line Interface (CLI), Uniform Data Packet (UDP) packet exchange, Transmission Control Protocol (TCP) session and other means known in the art.

Figure 2:
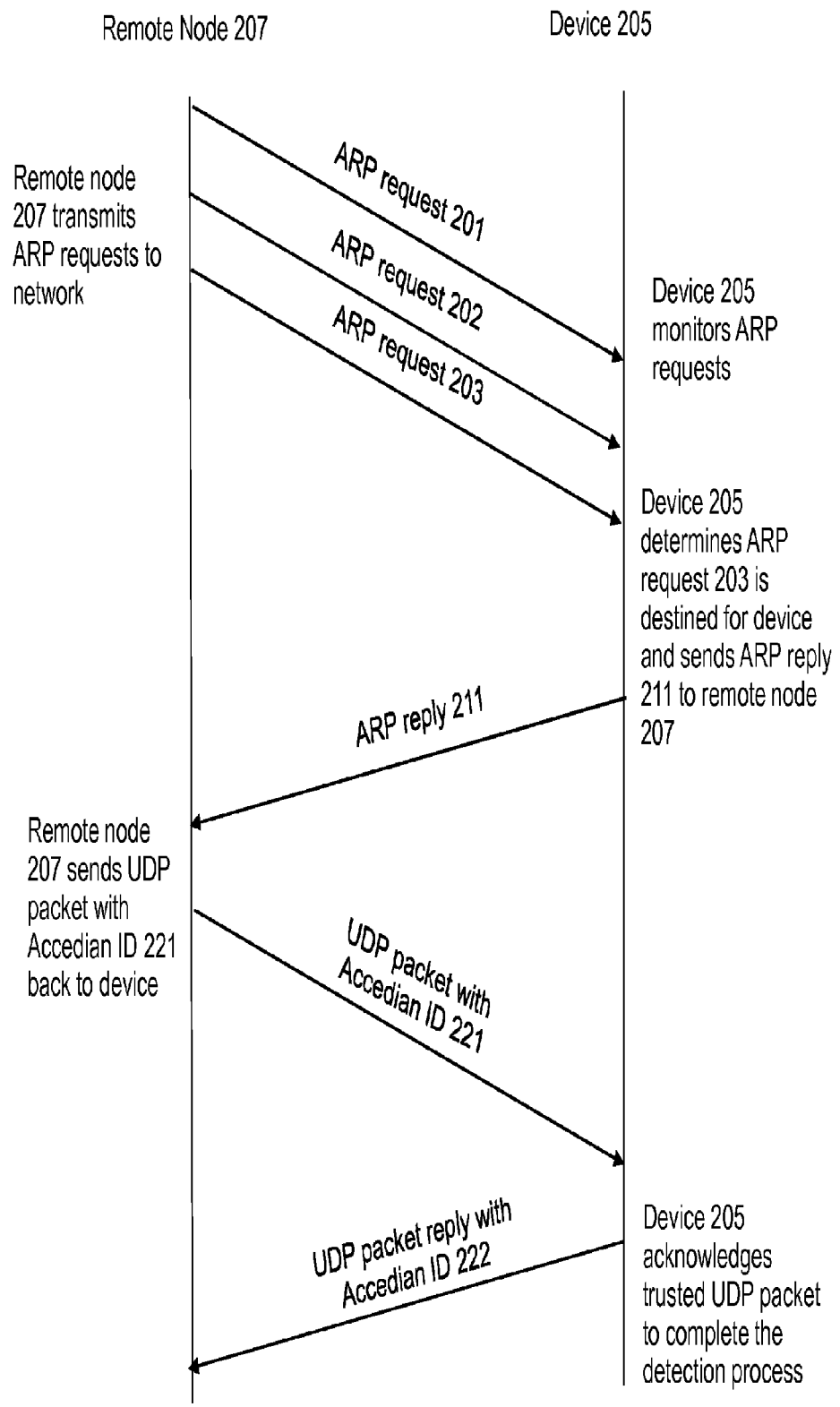
FIG. 2 is a message flow diagram showing the exchange of messages between a discoverer and a device to be discovered.

An embodiment of this invention is exemplified in FIG. 2. The discoverer 207 transmits as a broadcast frame an ARP Request a pre-determined number of times (e.g., ARP Requests 201, 202 and 203). RFC 3927 recommends a value of PROBE_NUM (set to 3 in RFC 3927), but other values can be used with the same result. Upon receiving the last ARP Request 203 from the same source (discoverer 207) and within a pre-determined timeout period, the device to discover 205 will assume the ARP Request exchange (201, 202 and 203) is from a trusted node and is meant to provide it with an IP address to initialize the device 205 into a configurable or ready state. The device to discover 205 will then reply with an ARP Reply (211) confirming that the device now claims ownership of the IP address. The device to discover 205 will then wait for the discover 207 to confirm it is indeed a trusted sender. The discoverer 207 receives the ARP reply 211. The trusted sender (discoverer 207) will reply to the ARP Reply 211 with a UDP packet 221 that contains a pre-agreed UDP Port number assigned by the IRNA that indicates the overall exchange is from a trusted sender. Upon receiving the UDP packet 221, the device to discover 205 is now formally discovered and can be further managed, configured or controlled using the allocated IP address. If the device to discover 205 does not receive a valid UDP packet during a defined timeout period, it reverts back into the mode of monitoring the ARP requests. The valid UDP packet 221 may contain additional information destined to be used by the device to discover 205 as part of its operation. The device to discover 205 completes the discovery process by replying with a UDP packet 222 to the discoverer 207 to confirm that the device to discover 205 is indeed the right type of device. The reply may include information specific to the device to discover 205 that will help with its management, control or configuration.

Once the device to discover 205 is formally discovered and ready to be managed, configured or controlled, the discovered or any other trusted node can be used for this phase. The allocated IP address may be used through various well-known techniques for the stated purpose, for instance SSL/HTTPS for WEB or CLI, UDP, TCP or other methods can be used.

Figure 3:
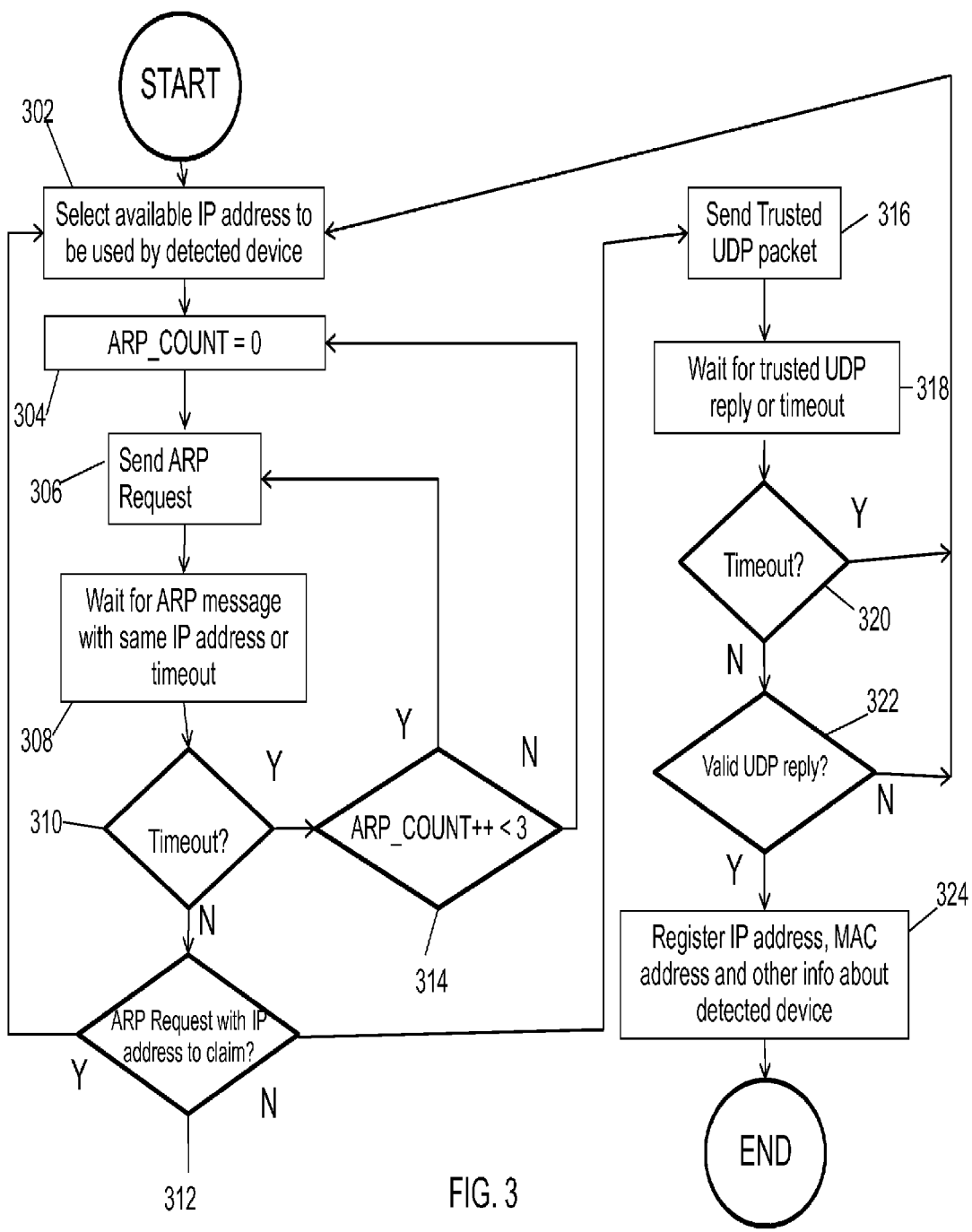
FIG. 3 is a flowchart of an embodiment of a discoverer.

FIG. 3 illustrates a flowchart of an embodiment of the discoverer. The discoverer selects the next available IP address it can offer to a detected device in step 302. The next step is to initialize an ARP_COUNT counter to keep track of the number of ARP Requests that have been generated to date for this IP address in step 304. As disclosed previously, this embodiment relies on 3 ARP Requests to determine if a device has claimed this IP address. After sending an ARP Request in step 306, the discoverer waits in step 310 for either a timeout or the reception of an ARP message (Request or Reply) with the same IP address in step 312. The timeout period may be any predetermined period and may be individually configured. If no ARP message is received during the timeout period, the ARP_COUNT is incremented in step 314. Thus, if the ARP count was 0 before, it is incremented to 1; if it was 1 before, it is incremented to 2, if it was 2 before, it is incremented to 3. If the ARP_COUNT is still less than 3, a new ARP Request can be sent. If the ARP_COUNT reaches the maximum of 3, there are no devices to detect at this time. According to other aspects of the present invention, the ARP_COUNT may be lower or higher than 3.

The discoverer should reset the ARP_COUNT to 0 and begin the detection sequence again, ideally after a random pause or period of time to avoid loading the network with continuous ARP traffic. Otherwise, if an ARP message is received, it is verified to determine whether another ARP Request was received for the same IP address. If an ARP Request has been previously received for the same IP address, another device is looking for or trying to use the same IP address and the discoverer shall select another IP address and restart the detection process after a random pause. Otherwise if an ARP Request has been received and no other ARP request had been previously received for the same address, the ARP message is an ARP Reply. The discoverer then confirms that the detected device is the right type of device. In order for the discoverer to confirm that the detected device is the right type of device, it generates and sends in step 316 a trusted UDP packet for the detected device (destination MAC address and IP address set to the information in the ARP Reply), where the trusted UDP packet uses a uniquely assigned UDP port number and a payload that may be encrypted or not encrypted and that may include information and settings to be used by the detected device as part of its operation. The discoverer then waits in step 318 for a trusted UDP reply in step 322 from the detected device during a timeout period 320. If a valid trusted UDP reply is received, the MAC and IP address of the detected device along with any other information that may be included in the payload of the trusted reply are saved in step 324 for future use in the control, operation and configuration of the detected or discovered device. Otherwise, if no trusted UDP reply is received within a timeout period, the detected device is not of the right type. The discoverer shall then restart the detection process after a random pause or a predetermined time period.

Figure 4:
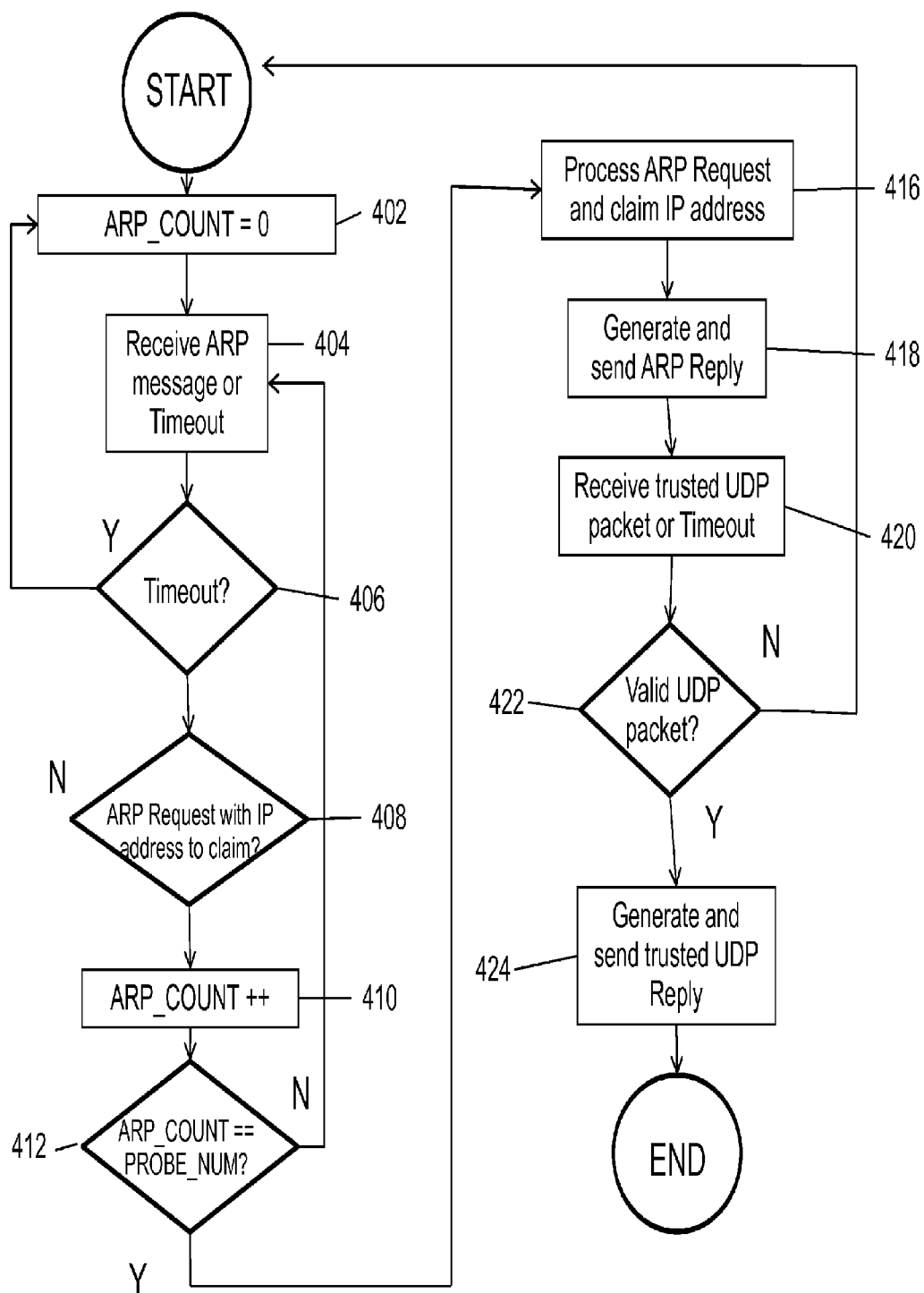
FIG. 4 is a flowchart of an embodiment of a device to be discovered.

FIG. 4 illustrates a flowchart of an embodiment of a device to discover. The ARP_COUNT is used to count the number of ARP Requests and is initialized to 0 in step 402. Upon detecting a first ARP Request message in step 404, the ARP count is incremented in step 410. The device to discover then determines in step 412 whether 3 ARP requests have been sent yet by the discoverer. The device to discover needs to wait during a predetermined timeout period in step 406 until a $3^{rd}$ (as defined by PROBE_NUM) ARP Request is transmitted before attempting to claim the IP address advertised in the ARP Request messages. According to another aspect of the present invention, the device to discover needs to wait for a suitable number of ARP requests before attempting to claim the IP address advertised in the ARP request messages. If the next ARP Request is not detected within a timeout value, the ARP_COUNT is reset to zero and the wait for the next ARP Request sequence begins again. Otherwise, after the $3^{rd}$ ARP Request, the device to discover processes the ARP request and claims the IP address in step 416. The device to discover will generate and send in step 418 an ARP Reply based on the assumption that the advertised IP address in the ARP Request is advertised by a discoverer and is therefore available to be used. After sending the ARP Reply, the device to discover will wait for a trusted or valid UDP packet in step 420 from the discoverer during a timeout period before it can safely conclude that the IP address was indeed offered by a discoverer. If the device to discover determines in step 422 that no trusted UDP packet is received within a timeout period, the IP address was not really available to be claimed and the device to detect shall no longer use that IP address and shall restart the wait to be detected. If a trusted UDP packet is received, the IP address can now safely be used. Any control, management or configuration information included in the payload of the trusted UDP packet should be saved by the detected device. The detected device then sends a trusted UDP reply (using the uniquely assigned UDP port) and the payload of the trusted UDP reply in step 424 may include information about the detected device to assist in its control, operation and configuration. Optionally, the payload of the trusted UDP reply may be encrypted.

The device to discover and the discoverer node are each coupled to a processor. The present invention includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGA's), digital signal processors (DSP's), micro-controllers, and the like, programmed according to the teachings of the exemplary embodiments of the present invention, as is appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits or by interconnecting an appropriate network of conventional component circuits, as is appreciated by those skilled in the electrical arts. Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present invention can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of assigning an IP address to a first device in a communication network having multiple interconnected nodes, at least one discoverer node and a plurality of other devices, comprising:
   transmitting, by the discoverer node to the network, a plurality of address resolution protocol (ARP) requests associated with a selected first IP address;
   monitoring, by the first device, the network for ARP requests;
   receiving, by the first device, the plurality of ARP requests;
   determining, by the first device, whether the plurality of ARP requests are unanswered by the other devices and claiming, by the first device, via an ARP reply, the selected IP address associated with the plurality of unanswered ARP requests; and
   exchanging a pair of packets between the discoverer node and the first device to assign the selected IP address.

2. The method of claim 1, wherein the packets are User Datagram Protocol (UDP) packets are marked with a proprietary identifier.

3. The method of claim 1, wherein the first device filters the ARP requests.

4. The system of claim 1, further comprising transmitting, by the discoverer node, the plurality of ARP requests until an ARP reply from the first device is received by the discoverer node.

5. The system of claim 4, wherein the plurality of ARP requests that are transmitted by the discoverer node is determined based on at least one of
   (1) configuration of the discoverer node, and
   (2) the first device.

6. The method of claim 1, further comprising monitoring, by the discoverer node, for any ARP requests with a same IP address as the selected IP address from said other devices within the network.

7. The method of claim 6, further comprising selecting, by the discoverer node, a second IP address when an ARP request with the same IP address is detected.

8. The method of claim 1, wherein the exchanging the pair of packets includes transmission of a trusted UDP packet by the discoverer node to the device.

9. The method of claim 8, wherein a trusted UDP packet is addressed to a uniquely assigned UDP port.

10. The method of claim 8, wherein a trusted UDP packet is encrypted.

11. The method of claim 8, wherein a trusted UDP packet includes information to be used by the first device, said information including at least one of
    (1) permanent or temporary configuration details,
    (2) operation parameters,
    (3) settings, and
    (4) control commands.

12. A system for assigning an IP address to a first device in a communication network having multiple interconnected nodes, a discoverer node and a plurality of other devices, the system comprising:
    the discoverer node coupled to a first processor to transmit a plurality of ARP requests associated with a selected IP address to the network; and
    the first device coupled to a second processor, to receive from the network said ARP requests, transmitted by the discoverer node and to determine whether the plurality of ARP requests are unanswered by said plurality other devices in the network;
    wherein the first device answers the unanswered ARP requests with an ARP reply to claim the selected IP address associated with the ARP requests and wherein the discoverer node and the first device exchange a pair of packets to assign the selected IP address.

13. The system of claim 12, wherein the first device incorporates a field programmable gate array (FPGA).

14. The system of claim 12, wherein the discoverer node sends the plurality of ARP requests based on predetermined criteria.

15. The system of claim 12 where the exchanging the pair of packets includes the transmission of a trusted UDP packet by the first device to the discoverer node.

16. The system of claim 15, wherein the trusted UDP packet is addressed to a uniquely assigned UDP port.

17. The system of claim 15, wherein the trusted UDP packet is encrypted.

18. The system of claim 15, wherein the trusted UDP packet includes information about the first device, said information including at least one of
    (1) permanent or temporary configuration details,
    (2) operation parameters,
    (3) settings, and
    (4) control commands.

* * * * *